United States Patent
Rhoads (10) Patent No.: US 10,626,939 B2
(45) Date of Patent: Apr. 21, 2020

(54) ADHESIVE ATTACHMENT OF THE DISC BRAKE PUSHROD PLATE TO THE DIAPHRAGM

(75) Inventor: David C. Rhoads, Boonville, MO (US)

(73) Assignee: HALDEX BRAKE PRODUCTS CORPORATION, Kansas City, MO (US)

( * ) Notice: Subject to any disclaimer, the term of this patent is extended or adjusted under 35 U.S.C. 154(b) by 1913 days.

(21) Appl. No.: 12/831,789

(22) Filed: Jul. 7, 2010

(65) Prior Publication Data

US 2012/0006192 A1   Jan. 12, 2012

(51) Int. Cl.
| | |
|---|---|
| *F16D 65/28* | (2006.01) |
| *B60T 17/08* | (2006.01) |
| *B60T 13/569* | (2006.01) |
| *F04B 45/04* | (2006.01) |
| *F16D 121/02* | (2012.01) |
| *F16D 125/12* | (2012.01) |
| *F16D 123/00* | (2012.01) |
| *F16D 121/12* | (2012.01) |

(52) U.S. Cl.
CPC ............ *F16D 65/28* (2013.01); *B60T 13/569* (2013.01); *B60T 17/085* (2013.01); *F04B 45/04* (2013.01); *F16D 2121/02* (2013.01); *F16D 2121/12* (2013.01); *F16D 2123/00* (2013.01); *F16D 2125/12* (2013.01)

(58) Field of Classification Search
CPC ........ F16D 65/25; F16D 65/28; B60T 13/569; B60T 17/085; F04B 45/04–45/0536; F04B 43/02; F04B 43/023; F04B 45/041; F15B 15/10; F16J 3/02; F01B 19/02

USPC .................................. 417/413.1; 92/99, 101
See application file for complete search history.

(56) References Cited

U.S. PATENT DOCUMENTS

| | | | | |
|---|---|---|---|---|
| 3,092,032 | A | * | 6/1963 | Bentzinger ........................ 92/99 |
| 3,659,501 | A | | 5/1972 | Beard |
| 4,050,861 | A | | 9/1977 | Sakai et al. |
| 4,334,838 | A | * | 6/1982 | Fessler et al. ................. 417/395 |
| 4,598,625 | A | | 7/1986 | Belart |
| 4,860,640 | A | * | 8/1989 | Ware ................................. 92/63 |
| 4,936,758 | A | * | 6/1990 | Coble .......................... 417/413.1 |
| 5,676,531 | A | * | 10/1997 | Muscarella et al. ........ 417/413.1 |
| 5,687,633 | A | | 11/1997 | Eady |
| 5,992,297 | A | * | 11/1999 | Plantan ...................... F16J 3/02 |
| | | | | 92/98 R |
| 5,996,470 | A | * | 12/1999 | Eady et al. ........................ 92/99 |

(Continued)

FOREIGN PATENT DOCUMENTS

| | | |
|---|---|---|
| CN | 1900548 A | 1/2007 |
| GB | 2088525 A | 6/1982 |

*Primary Examiner* — Bryan M Lettman
(74) *Attorney, Agent, or Firm* — Dilworth IP, LLC (57) ABSTRACT

A spring brake actuator having a push rod plate and a diaphragm. A rim projects from the diaphragm for engaging a housing containing the push rod plate. A sidewall is connected to the rim, which is connected to a bottom surface, forming an outer diameter of the diaphragm. Flanges, perpendicular to the diaphragm, extend from the diaphragm forming an inner diameter for which the push rod plate is inserted into. An adhesive is placed between the diaphragm and the push rod plate, wherein the adhesive maintains an attachment and a seal between the diaphragm and the push rod plate keeping the diaphragm and the push rod plate in line with each other.

15 Claims, 4 Drawing Sheets

(56) References Cited

U.S. PATENT DOCUMENTS

| | | |
|---|---|---|
| 6,349,629 B1 | 2/2002 | Plantan et al. |
| 6,453,794 B2 | 9/2002 | Castel et al. |
| 6,536,329 B2* | 3/2003 | Anderson et al. ................ 92/63 |
| 7,451,690 B2* | 11/2008 | Schrader et al. ................ 92/63 |
| 2006/0051219 A1* | 3/2006 | Becker et al. ............ 417/413.1 |
| 2007/0240564 A1* | 10/2007 | Uehara et al. .................... 92/99 |

\* cited by examiner

ADHESIVE ATTACHMENT OF THE DISC BRAKE PUSHROD PLATE TO THE DIAPHRAGM

FIELD OF THE INVENTION

The present invention relates generally to braking systems and, more specifically, to brake diaphragms. Even more particularly, the present invention relates to the attachment of the disk brake push rod plate to the diaphragm using an adhesive.

BACKGROUND OF THE INVENTION

Braking systems, such as air brake systems, have generally been used to control movement of motor vehicles in a safe and effective manner. In particular, air brakes are commonly used on commercial vehicles such as trucks, trailers, and buses, which typically have large gross vehicle weights. The considerable inertial mass of these heavy-duty vehicles, in combination with the high speeds at which they travel, often requires a braking system which responds rapidly with substantial braking power. One system component which may be instrumental in the operation of air brake systems is the brake actuator. The brake actuator typically provides the necessary force when braking the vehicle.

Air-operated brake actuators are either piston type or diaphragm type. In the diaphragm type spring brake actuator, two air-operated diaphragm brake actuators are typically arranged in a tandem configuration, which includes an air-operated service brake actuator for applying the normal operating brakes of the vehicle, and a spring brake actuator for applying the parking or emergency brakes of the vehicle. Both the service brake actuator and the spring brake actuator include a housing having an elastomeric diaphragm dividing the interior of the housing into two distinct fluid chambers. On the other hand, the piston brake actuator operates under basically the same principles as above described, except that instead of a diaphragm, a piston with a sliding seal at the outside diameter reciprocates in a cylinder for applying the normal and/or parking brakes of the vehicles.

In a typical service brake actuator, the service brake section is divided into a pressure chamber and a push rod chamber. The pressure chamber is fluidly connected to a source of pressurized air and the push rod chamber mounts a push rod, which is coupled to the brake assembly, whereby the introduction and exhaustion of pressurized air into the pressurized chamber reciprocates the push rod into and out of the actuator to apply and release the operating brakes.

In a typical spring brake actuator, the spring brake section is divided into a pressure chamber and a spring chamber. A push rod plate is positioned in the spring chamber between the diaphragm and a strong compression spring, whose opposing end abuts the housing. In one well-known configuration, a push rod extends from the push rod plate, through the diaphragm, into the pressure chamber, and through a dividing wall separating the spring brake actuator from the service brake actuator. The end of the actuator is fluidly connected to the pressure chamber of the service brake actuator.

When applying the parking brakes, the spring brake actuator pressure is discharged from the pressure chamber and the large force compression spring pushes the push rod plate and the diaphragm toward the dividing wall between the spring brake actuator and the service brake actuator. In this position, the push rod connected to the push rod plate is pushed forward extending into the service section through the dividing center wall applying the parking or emergency brakes and thus forcing the vehicle to stop or remain parked. To release the parking brake, the pressure chamber is closed to the atmosphere and pressurized air is introduced into the pressure chamber of the spring brake actuator which expands the pressure chamber, moving the diaphragm and push rod plate toward the opposing end of the spring brake actuator housing, thereby compressing the strong compression spring.

One known problem in association with service brake actuators of this design is that the push rod plate of an actuator is known to slip, and to move. During normal weather, the push rod plate may move out of alignment with the diaphragm. During wet weather, water mixed with road oil and dirt migrates between the push rod plate and the diaphragm, and acts as a lubricant. The push rod plate can slide radially out of center position, which can restrict the actuator stroke and/or reduce the force output of the actuator. This presents a problem as the service brake will not work as efficiently as under normal conditions, which can lead to longer stopping distances, and eventual malfunction of the service brake.

Prior art designs have attempted to solve this problem and provide an improved modification to accommodate misalignment of the push rod plate in the interior surface of the diaphragm of the service brake actuator. Different designs for diaphragms exist to solve this problem. However, prior art designs are limited as they do not efficiently and cheaply keep the push rod plate aligned with the diaphragm.

Typically, diaphragms for service brake actuators are made from a layer of fabric that forms an integral structure of the diaphragm. Diaphragms in service brake actuators are generally supported at their periphery within a housing of the actuator. Upon introduction of a fluid pressure on one side of the diaphragm, the diaphragm moves a push plate or piston to actuate a braking mechanism. The diaphragm is returned to its normal position when compressed air is released exerting an opposite force on the push rod plate.

Diaphragms for brake actuators generally are cup shaped with a bottom wall or base merging into a conical sidewall. The conical sidewall terminates at a rim which is clamped between an upper and lower portion of a housing unit. A force is exerted by the diaphragm upon a push rod plate, and the diaphragm is typically in direct contact with the push rod plate. Problems occur when the push rod plate slips laterally with respect to the diaphragm, limiting the direct touching, and proper force placement, between the diaphragm and push rod plate. This can restrict the actuator stroke and/or reduce the force output of the actuator.

It is thus desirable to develop an attachment of the push rod plate to the diaphragm for a brake actuator that is easily and cheaply manufactured, and that maintains the alignment between the push rod plate and the diaphragm.

SUMMARY OF THE INVENTION

The invention is directed to an adhesive attachment of the push rod plate to the diaphragm for use in a spring brake actuator. The design allows for the push rod plate to be easily and cheaply adhered to the diaphragm without the need for an expensive mechanical connection between the push rod plate and the diaphragm.

Another object of the present invention is to provide a spring brake actuator having the above characteristics and which is simple in design as compared with known spring brake actuators.

A further object of the present invention is to provide a spring brake actuator having the above characteristics and which is relatively easy and inexpensive to produce and assemble.

Still another object of the present invention is to provide a spring brake actuator having the above characteristics and which does not require special machinery to assemble.

Yet a further object of the present invention is to provide a spring brake actuator having the above characteristics and which can be made of conventional materials.

These and other objects of the present invention are achieved by provision of a spring brake actuator having a push rod plate adhesively attached to a diaphragm. A brake diaphragm in accordance with the present invention has a projecting rim for engaging a housing containing a piston, a bottom wall having an interior surface for engaging the piston, and a sidewall connecting the projecting rim with the bottom wall. An adhesive is placed between on the diaphragm such that when the push rod plate engages the diaphragm, an adhesive seal is created between the push rod plate and the diaphragm. During operation of the brake by the spring brake actuator, the adhesive maintains a constant attachment between the push rod plate and the diaphragm, keeping both in line with each other. As a result, brake operating is not impaired by a misaligned push rod plate and diaphragm.

Preferably, a single portion of adhesive is used at the center of the push rod plate to attach the push rod plate to the diaphragm. In a second embodiment, the adhesive covers the entire surface of the push rod plate that is to be attached to the diaphragm. In another preferred embodiment, multiple smaller portions are space around the surface of the push rod plate to be attached to the diaphragm.

The invention and its particular features and advantages will become more apparent from the following detailed description considered with reference to the accompanying drawings.

DETAILED DESCRIPTION OF THE INVENTION

The exemplary embodiments of the present invention may be further understood with reference to the following description and the related appended drawings, wherein like elements are provided with the same reference numerals.

Figure 1:
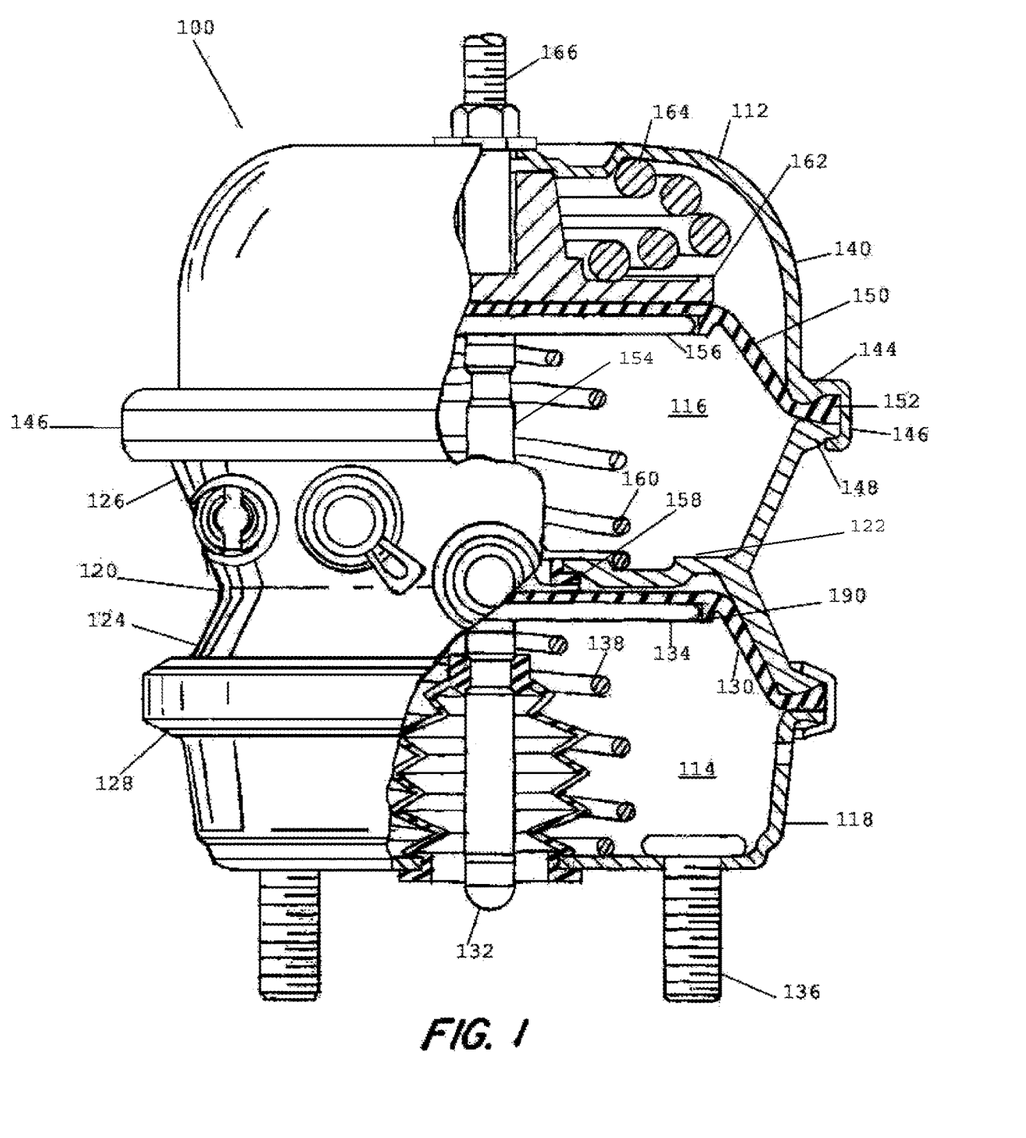
FIG. 1 is a side elevation view, partially in section, of a spring brake actuator in accordance with the present invention.

Referring first to FIG. 1, a brake actuator 100, in a double diaphragm spring brake, according to the present invention is shown. It should be noted, while further description relates to a double diaphragm spring brake, the present invention can be used in any braking system containing a diaphragm and a pushrod plate, including a single diaphragm system. The embodiment shown is an air-operated dual diaphragm spring brake actuator 100, which includes a housing 112 containing a service chamber 114 and a spring chamber 116 in tandem. The service chamber 114 is defined by a cup-shaped service housing 118 and a flange case 120. The flange case 120 is double cup-shaped and includes a divider wall 122 separating a service side 124 of the flange case 120 from a spring side 126 of the flange case 120. The service housing 118 is secured to the service side 124 of the flange case 120 using a conventional bolted clamp 128, or any other of numerous means as are known in the art. An elastomeric service brake diaphragm 130 is clamped in fluid tight engagement between the service housing 118 and the service side 124 of the flange case 120. The service brake diaphragm 130 contains flanges 190 (further seen in FIG. 2) protruding from the surface of service brake diaphragm 130 forming an inner diameter. Although not shown, an aperture is provided in the flange case 120 for providing communication between a source of compressed air and a portion of the service chamber 114 between the diaphragm 130 and the divider wall 122 of the flange case 120, also as is known in the art.

A service push rod assembly including a push rod 132 extends through the service housing 118 into the service chamber 114, and mounts a service push rod plate 134 at an inner end thereof. The service push rod 132 for a Disc Brake system, (shown) is thrust into a cupped lever arm in a caliper (not shown). The service push rod plate 134 for a Drum Brake system, (not shown) is threaded with a clevis and pin to the lever to actuate the brake. In addition, bolts 136 are provided for mounting the service housing 118 to the vehicle. A service return spring 138 extends between the service housing 118 and the service push rod plate 134 to bias the service push rod plate 134 and thus push the service push rod 132 into the service chamber 114 to release the brake. The service push rod plate 134 is of a diameter slightly smaller than that of the flanges 190 such that the service push rod plate 134 fits into the diameter formed by flanges 190. The spring biased service push rod plate 134 normally forces the service brake diaphragm 130 against the divider wall 122 of the flange case 120 in the brake release position.

When air pressure is supplied through the aperture in the service side 124 of the flange case 120 as, for example, when the brakes are applied by a vehicle operator, compressed air is introduced between the service brake diaphragm 130 and the divider wall 122, thereby forcing the diaphragm toward the service housing 118. In this manner, the service push rod 132 is extended outwardly of the service chamber 114 to apply braking pressure to the vehicle brakes in a conventional fashion.

The spring chamber 116 is defined by the spring side 126 of the flange case 120 and a head 140. The head 140 includes, a shoulder portion 144 and a collar 146 extending therebetween. The collar 146 tightly fits over, and is secured to, a radially outwardly extending flange portion 148 of the spring side 126 of the flange case 120, as described below in detail. A spring diaphragm 150 has a rim 152 clamped in a fluid tight manner between radially outwardly extending flange portion 148 of the spring side 126 of the flange case 120 and collar 146 of the head 140.

An aperture (not shown) is provided within the spring side 126 of the flange case 120 to connect a portion of the spring chamber 116 between the dividing wall 122 and the spring diaphragm 150 with a source of compressed air (not shown). A flange case push rod 154 extends between the spring chamber 116 and the service chamber 114, and has a first reaction plate 156 rigidly mounted to one end, and a second reaction plate 158 mounted to the other end thereof. A return spring 160 is mounted within the spring chamber 116 between the divider wall 122 and the first reaction plate 156 to bias the flange case push rod 154 into the release position.

A pressure plate 162 bears against the spring diaphragm 150, and a power spring 164 is positioned between the pressure plate 162 and the head 140 to bias the pressure plate 162 and the push rods 132, 154 to a brake actuating position. The flange case 120 is typically cast aluminum and the head 140 is typically stamped or spun low-carbon steel. The actuator 100 may include a release tool 166 that extends within the head 140 for mechanically drawing the pressure plate 162 against the head 140 such that the power spring 164 assumes a retracted or "caged" position. The release tool can thus mechanically release the brake after a loss of power or air pressure, as is known in the art.

In operation, air pressure is continually supplied to the spring chamber 116 through the aperture (not shown) to maintain the spring diaphragm 150 in a position to compress the power spring 164. In this position, the service push rod 132 normally is operated as described above by selective pressurization of air into the service chamber 114. However, in the event of failure of the air pressure system, the pressure in the spring chamber 116 will be decreased so that the service return spring 138 and flange case return spring 160 would no longer be able to overcome the pressure of the much larger and stronger power spring 164. Thus, the pressure plate 162 forces the spring diaphragm 150 and thus the flange case push rod 154 outwardly, thereby also forcing the service push rod 132 outwardly to apply braking pressure to the brakes.

The power spring 164, therefore, must be compressed between the pressure plate 162 and the head 140 during normal driving and normal service brake mode, as shown in FIG. 1. In these modes, the power spring 164 exerts substantial force on head 140 in the direction away from flange case 120.

Figure 2:
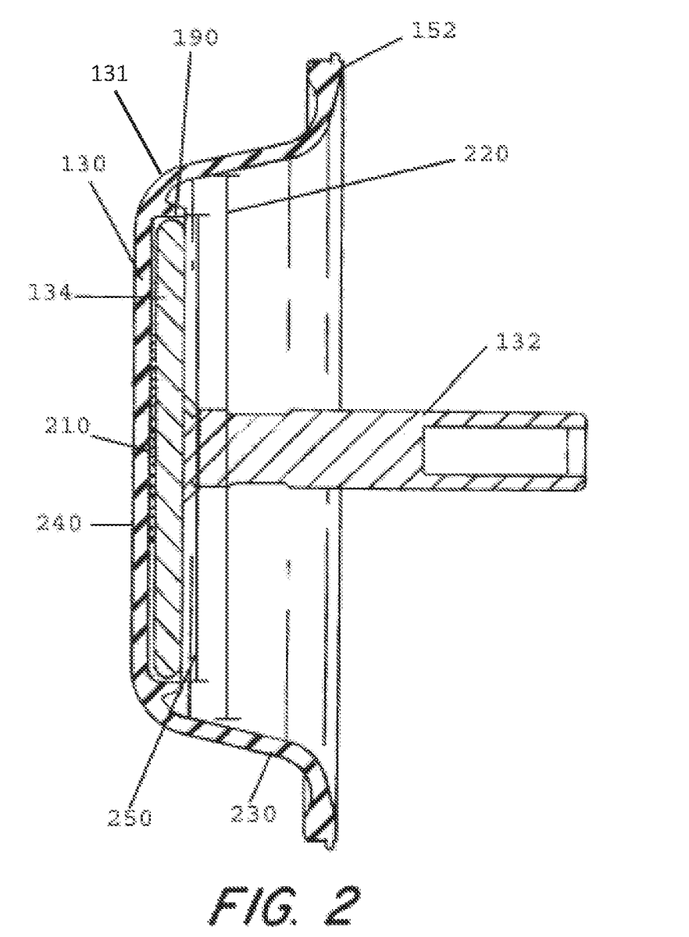
FIG. 2 is an enlarged side view of a push rod, push rod plate, and diaphragm of FIG. 1

Referring now to FIG. 2, there is an enlarged side view of a push rod, push rod plate, and diaphragm of FIG. 1. Diaphragm 130 is composed of a rim 152 which is clamped between an upper and lower portion of a housing unit. Rim 152 is connected to sidewall 230 which tapers towards bottom wall 240. The sidewall 230 connects the rim 152 with the bottom wall 240 via a curved abutment 131. An outer diameter 220 is formed at the connection between sidewall 230 and bottom wall 240.

Diaphragm 130 further contains flanges 190 which form an inner diameter 250, which is smaller than outer diameter 220. As shown, diaphragm 130 has two flanges 190 protruding from the inside of bottom wall 240. It should be noted, however, that there could be any number of flanges protruding from bottom wall 240 including a single flange forming a complete circle inside outer diameter 220, or there can be no flanges protruding from bottom wall 240. As shown, flanges 190 are perpendicular to diaphragm 130 and portray a constant inner diameter. However, flanges 190 may be at an angle other than 90 degrees, with respect to diaphragm 130, such that inner diameter 250 becomes smaller towards the edges of flanges 190.

Push rod plate 134 is sized such that the diameter of the push rod plate 134 is smaller than the inner diameter 250. This allows push rod plate 134 to fit inside inner diameter 250 and thus inside flanges 190. Flanges 190 help keep push rod plate 134 from sliding laterally. If inner diameter 250, represented by tapering flanges 190, becomes smaller at the edges of flanges 190, then Flanges 190 surround push rod plate 134 and help prevent push rod plate 134 from pulling away from bottom wall 240. Push rod plate 134 is further attached to push rod 132, which is used to actuate the brake.

Adhesive 210 is placed between push rod plate 134 and diaphragm 130 to immovably connect push rod plate 134 to diaphragm 130. Adhesive 210 helps to maintain constant contact between push rod plate 134 and diaphragm 130, and maintains the position of push rod plate 134 in relation to diaphragm 130. The result is the prevention of push rod plate 134 from sliding laterally with respect to diaphragm 130, and maintains better, more constant brake power. In the embodiments show, adhesive 210 is placed on push rod plate 134, and then push rod plate 134 is attached to diaphragm 130. However, it should be noted, that adhesive 210 can be placed on the diaphragm 130 and not on push rod plate 134.

Adhesive 210 can be any know adhesive. For example, adhesive 210 can be heat curable or can be cured at room temperature. Adhesive 210 can be an epoxy adhesive or a polyurethane adhesive. Finally, adhesive 210 can be water based or solvent based. It should be noted, that the above exemplary adhesives are used as examples of adhesives, and that any adhesive can be used to connect push rod plate 134 to diaphragm 130, not limited to the list above.

Figure 3:
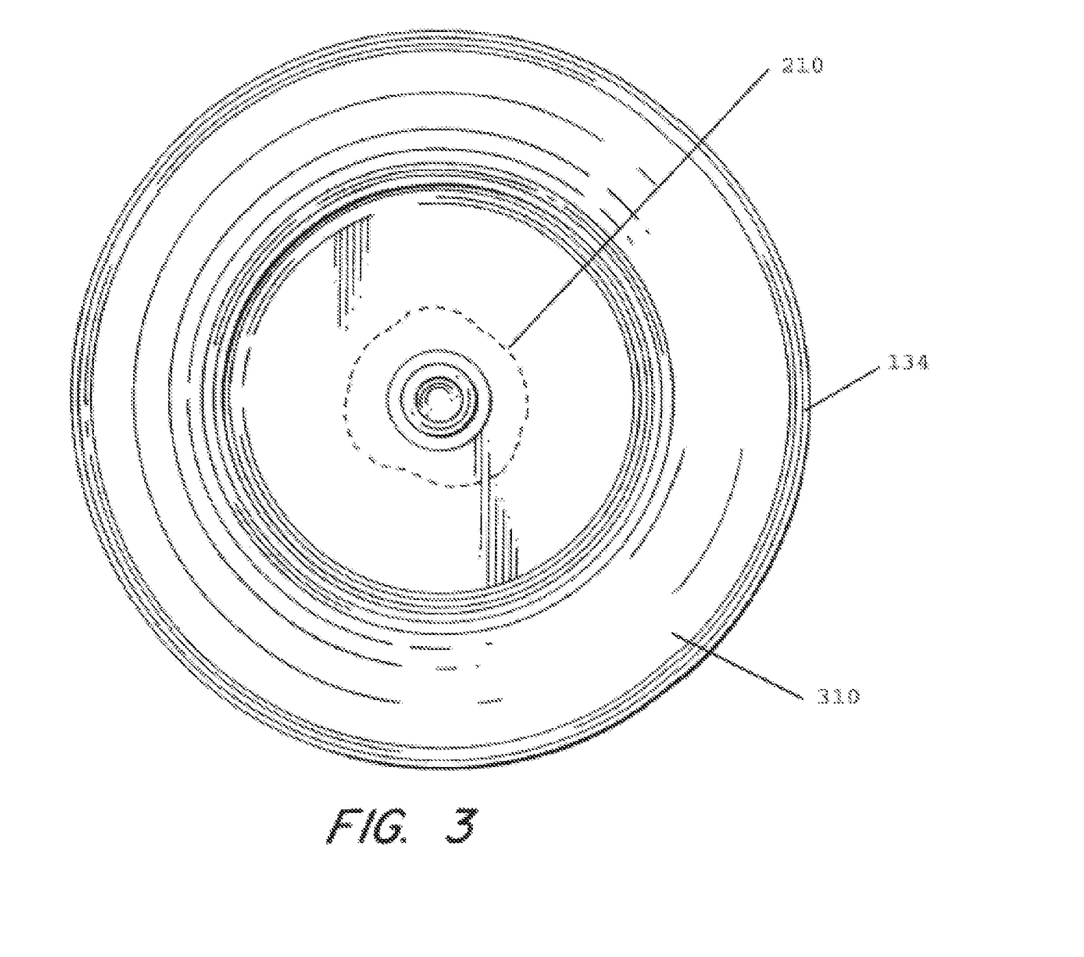
FIG. 3 is an enlarged view of a push rod plate with a single adhesive area.

Referring now to FIG. 3, is an enlarged view of the bottom surface 310 of push rod plate 134. Bottom surface 310 has adhesive 210 placed at the center of the push rod plate 134. Push rod plate 134 is then placed inside inner diameter 250 and against diaphragm 130. Adhesive 210 is a single portion of adhesive placed at the center of push rod plate 134. As the force generated by the attachment of push rod 132 to push rod plate 134 is concentrated at the center of push rod plate 134, only a small amount of adhesive 210 placed at the center of push rod plate 134 is required. However, any amount of a single portion of adhesive 210 can be used including covering a smaller or larger surface area of push rod 134 then represented in FIG. 3, including the entire surface area of push rod plate 134. A larger adhesive will help maintain better stability and may be better at preventing push rod plate 134 from sliding laterally with respect to diaphragm 130. However, any amount of adhesive can be used.

Figure 4:
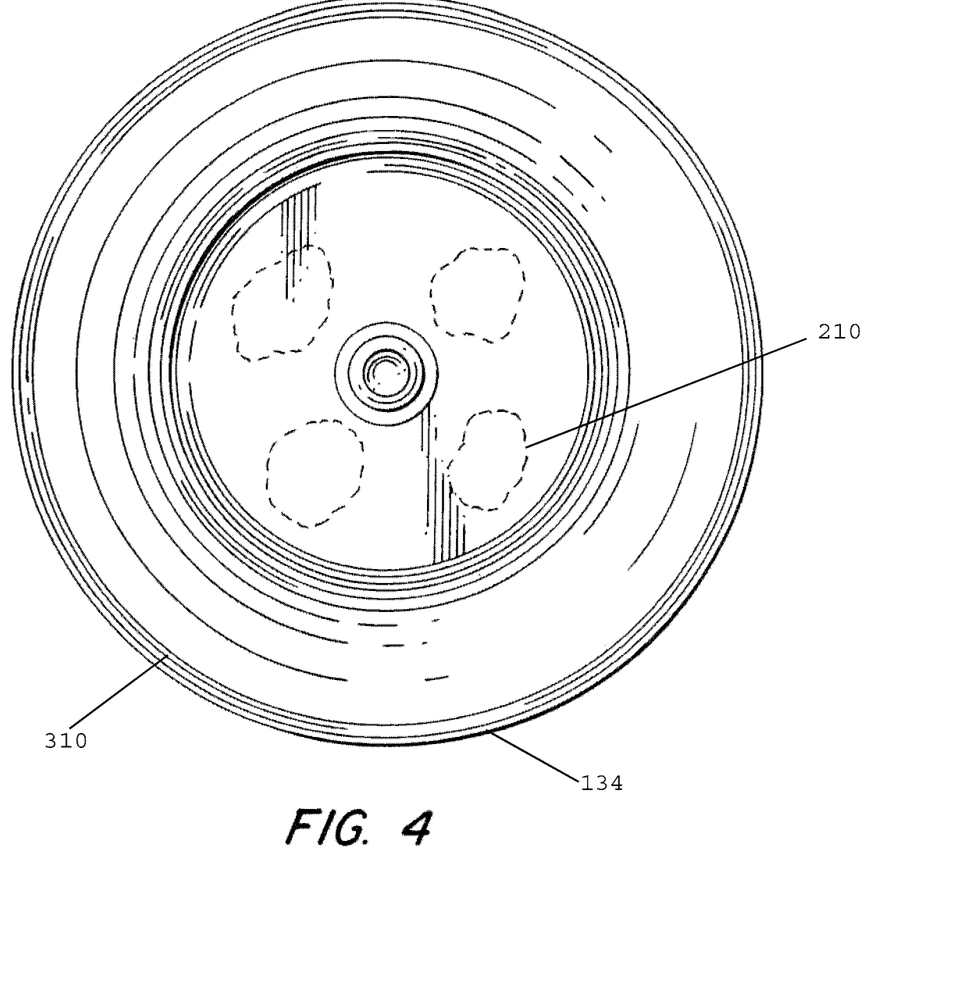
FIG. 4 is an enlarged view of a push rod plate with multiple adhesive areas

Referring now to FIG. 4, there is a second enlarged view of push rod plate 134 with bottom surface 310. Smaller amounts of a plurality of portions of adhesive 210 are placed on bottom surface 310 of push rod plate 134. Smaller amounts placed over the entire surface allow less adhesive to be used than covering the entire bottom surface 310 of push rod plate 134. Adhesive 210 can be placed at random, or predetermined locations on the bottom surface 310 of push rod plate 134. Smaller amounts, of strategically placed adhesive 210, may allow for better resistance to the lateral forces exerted by push rod plate 134 in relation to diaphragm 130 by spreading out the resistance across bottom surface 310. In the exemplary embodiment of FIG. 4, 4 portions of adhesive 210 are used to cover bottom surface 310, however, it should be noted that any amount of a plurality of portions can be used to cover bottom surface 310.

The present invention, therefore, provides a spring brake actuator which uses an adhesive to attach a push rod plate to a diaphragm to prevent the lateral movement of the push rod plate with respect to the diaphragm.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An air brake actuator, comprising:
a housing;
a spring chamber in said housing;
a service chamber in said housing;
a first one of said spring chamber or said service chamber including:
a push rod assembly including a push rod plate, said push rod plate having a distal surface, a circumferential edge, and a proximal surface opposite the distal surface;
a diaphragm comprising:
a rim projecting from said diaphragm for engaging a housing containing said push rod plate,
a bottom wall having an interior surface for engaging said push rod plate, and
a sidewall connecting said projecting rim with said bottom wall via a curved abutment;
at least one flange extending in an axial direction from a periphery of the interior surface of the bottom wall of said diaphragm, adjacent to the curved abutment of the sidewall, to a distal end terminating at or beyond the proximal surface of the push rod plate in the axial direction, the at least one flange including an inner wall adjacent to and at least partially circumscribing the circumferential edge of the push rod plate, the inner wall terminating at the distal end radially outboard of the circumferential edge of the push rod plate; and
an adhesive between said diaphragm and the distal surface of said push rod plate, wherein said adhesive maintains an attachment and a seal between said diaphragm and said push rod plate keeping said diaphragm and said push rod plate in line with each other;
a second one of said spring chamber or said service chamber including:
a second push rod plate having a distal surface and a circumferential edge; and
a second diaphragm comprising a rim projecting from the second diaphragm for engaging said housing, a bottom wall having an interior surface for engaging the second push rod plate, and a sidewall connecting the rim with the bottom wall via a curved abutment.

2. The brake actuator of claim 1, wherein said adhesive is a single portion placed only in a center portion of the push rod plate.

3. The brake actuator of claim 1, wherein said adhesive is a plurality of adhesive amounts spaced apart on said surface of said push rod plate.

4. The brake actuator of claim 1, wherein said adhesive covers an entire surface of said push rod plate.

5. The brake actuator of claim 1, wherein said adhesive restrains a lateral movement of said push rod plate.

6. A method for controlling a lateral movement of a push rod plate during actuation in an air brake actuator, the air brake actuator comprising a spring chamber and a service chamber, the method comprising steps of:
providing the service chamber with a diaphragm containing a rim, a bottom wall having an interior surface, and a sidewall connecting the rim with the bottom wall via a curved abutment, the bottom wall including at least one flange extending in an axial direction from a periphery of the interior surface, adjacent to the curved abutment, to a distal end;
providing the service chamber with a push rod assembly including a push rod plate sized to fit the interior surface of said bottom wall of said diaphragm, the push rod plate having a distal surface, a proximal surface opposite the distal surface, and a circumferential edge;
placing an adhesive on the distal surface of said push rod plate; and
engaging said push rod plate with said diaphragm using said adhesive to create an attachment and a seal between said diaphragm and the distal surface of said push rod plate;
the at least one flange having an inner wall which, upon engaging said push rod plate with said diaphragm, is adjacent to and at least partially circumscribes the circumferential edge of the push rod plate, the inner wall terminating at the distal end radially outboard of the circumferential edge of the push rod plate, wherein the distal end terminates in the axial direction at or beyond the proximal surface of the push rod plate,
providing the spring chamber with a reaction plate having a distal surface and a circumferential edge; and a second diaphragm comprising a rim projecting from the second diaphragm for engaging said housing, a bottom wall having an interior surface for engaging the reaction plate, and a side wall connecting the rim with the bottom wall via a curved abutment.

7. The method of claim 6, wherein said adhesive is a single portion placed only in a center portion of said push rod plate.

8. The method of claim 6, wherein said adhesive is a plurality of adhesive amounts spaced apart on said surface of said push rod plate.

9. The method of claim 6, wherein said adhesive covers an entire surface of said push rod plate.

10. The method of claim 6, wherein said at least one flange is perpendicular to said diaphragm.

11. The method of claim 6, wherein said at least one flange is at an angle other than perpendicular to said diaphragm.

12. An air brake actuator, comprising:
a housing;
a spring chamber in said housing; and
a service chamber in said housing, said service chamber including:
a push rod assembly including a push rod plate, said push rod plate having a distal surface and a circumferential edge;
a diaphragm comprising a rim projecting from said diaphragm for engaging said housing, a bottom wall having an interior surface for engaging said push rod plate, and a sidewall connecting the rim with the bottom wall via a curved abutment;
at least one flange extending in an axial direction from a periphery of the interior surface of the bottom wall of the diaphragm, adjacent to the curved abutment of the sidewall, the at least one flange including an inner wall adjacent to and at least partially circumscribing the circumferential edge of the push rod plate; and
an adhesive between the interior surface of said diaphragm and the distal surface of the push rod plate, the adhesive maintaining an attachment and a seal between the diaphragm and the push rod plate keeping the diaphragm and the push rod plate in line with each other,
wherein said spring chamber includes:
a reaction plate having a distal surface and a circumferential edge; and
a second diaphragm comprising a rim projecting from the second diaphragm for engaging said housing, a bottom wall having an interior surface for engaging the reaction plate, and a sidewall connecting the rim with the bottom wall via a curved abutment.

13. The air brake actuator of claim 12, wherein said adhesive is a single portion placed only in a center portion of the push rod plate.

14. The air brake actuator of claim 12, wherein said service chamber further includes a service return spring.

15. The air brake actuator of claim 12, wherein said second diaphragm includes at least one second flange extending in an axial direction from a periphery of the interior surface of the bottom wall of the second diaphragm, adjacent to the curved abutment of the sidewall, the at least one second flange including an inner wall adjacent to and at least partially circumscribing the circumferential edge of the reaction plate.

* * * * *